United States Patent
Totale et al.

(10) Patent No.: US 10,303,444 B2
(45) Date of Patent: *May 28, 2019

(54) COMPOSABLE APPLICATION SESSION PARAMETERS

(71) Applicant: EMC Corporation, Hopkinton, MA (US)

(72) Inventors: Sachin G. Totale, Pleasanton, CA (US); Marwan Suliman, Dublin, CA (US); Rajakumar Thiruvasagam, Bangalore (IN); Ramkumar Ganesan, Bangalore (IN); Saif Ali Ansari, Namchi (IN)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,384

(22) Filed: Nov. 15, 2016

(65) Prior Publication Data
US 2017/0123765 A1   May 4, 2017

Related U.S. Application Data (63) Continuation of application No. 14/136,342, filed on Dec. 20, 2013, now Pat. No. 9,529,572.

(51) Int. Cl.
| | |
|---|---|
| *G06F 9/44* | (2018.01) |
| *G06F 8/34* | (2018.01) |
| *G06F 9/445* | (2018.01) |
| *G06F 8/35* | (2018.01) |
| G06F 3/0484 | (2013.01) |

(52) U.S. Cl.
CPC ............ *G06F 8/34* (2013.01); *G06F 8/35* (2013.01); *G06F 9/44505* (2013.01); *G06F 3/04847* (2013.01)

(58) Field of Classification Search
CPC .......... G06F 8/34; G06F 8/35; G06F 3/04847; G06F 9/44505
USPC .................................................. 717/106–119
See application file for complete search history.

(56) References Cited

U.S. PATENT DOCUMENTS

| | | | |
|---|---|---|---|
| 7,234,140 | B2 | 6/2007 | Dortmans |
| 7,299,244 | B2 | 11/2007 | Hertling |
| 7,503,033 | B2 | 3/2009 | Meredith |
| 8,504,400 | B2 | 8/2013 | Purcell |
| 9,529,572 | B1 * | 12/2016 | Totale ................. G06F 9/44505 |

(Continued)

OTHER PUBLICATIONS

Kohana Team, "Session Library", Jan. 2012, retrieved from http://www.hcs.harvard.edu/~powerpak/kohanadocs/libraries/session.html, 6 pages.*

(Continued)

*Primary Examiner* — Ted T. Vo
(74) *Attorney, Agent, or Firm* — Van Pelt, Yi & James LLP (57) ABSTRACT

Developer-composed custom application session parameters are disclosed. In various embodiments, a definition of a custom application session parameter is received via a software development tool user interface. Application code to store and manage the custom application session parameter, including by making the custom application parameter available across a plurality of application user interface pages, is generated programmatically based at least in part on the definition.

19 Claims, 6 Drawing Sheets

(56) References Cited

U.S. PATENT DOCUMENTS

| | | |
|---|---|---|
| 9,851,951 B1 | 12/2017 | Ganesan |
| 2003/0233374 A1 | 12/2003 | Spinola |
| 2004/0111430 A1 | 6/2004 | Hertling |
| 2009/0019386 A1 | 1/2009 | Sweetland |
| 2011/0145037 A1 | 6/2011 | Domashchenko |
| 2011/0238458 A1 | 9/2011 | Purcell |
| 2012/0060163 A1 | 3/2012 | Khan |
| 2012/0278094 A1 | 11/2012 | Kovacevic |
| 2013/0219263 A1 | 8/2013 | Abrahami |

OTHER PUBLICATIONS www.gwtproject.org, "GWT", Jul. 2013, retrieved from https://web.archive.org/web/20130708095321/http://www.gwtproject.org/doc/latest/DevGuideHtml5Storage.html , 7 pages.*

The PHP Group, "What is PHP?", Jan. 2009, retrieved from http://web.archive.org/web/20090124160056/http://php.net/manual/en/intro-whatis.php , 1 page.*

W3school.com, "HTML5 Web Storage", Nov. 2012, retrieved from http://www.w3schools.com/html/html5_webstorage.asp , 3 pages.*

W3school.com, "Window setTimeout( ) Method", Nov. 2012, retrieved from https://www.w3schools.com/jsref/met_win_settimeout.asp , 2 pages.*

Eloone, "How does a web session work? Finally illustrated with diagrams", Oct. 2013, the webpage, Machines are Digging, 8 pages.* www.gwtproject.org, "GWT-Logging", Jul. 2013, retrieved from https://web.archive.org/web/20130716153359/http://www.gwtproject.org/doc/latest/DevGuideLogging.html, 6 pages. (Year: 2013).*

Sun Microsystems, "Understanding User Sessions and Application Sessions", 2007, retrieved from https://docs.oracle.com/cd/E19728-01/820-2550/sessions_intro.html, 2 pages (Year: 2007).*

* cited by examiner

COMPOSABLE APPLICATION SESSION PARAMETERS

CROSS REFERENCE TO OTHER APPLICATIONS

This application is a continuation of co-pending U.S. patent application Ser. No. 14/136,342 entitled COMPOSABLE APPLICATION SESSION PARAMETERS filed Dec. 20, 2013 which is incorporated herein by reference for all purposes.

BACKGROUND OF THE INVENTION

Advanced software development tools enable developers to define application interfaces (such as pages and fragments thereof) and functionality (e.g., action flows). Developer tools, such as the EMC® Documentum® xCP development platform, enable developers to create advanced applications with complex user and data service interactions. However, it is not possible to anticipate all application data values a developer may desire to define and use as application variables, and which application components will be desired to have access to which variables.

BRIEF DESCRIPTION OF THE DRAWINGS

Various embodiments of the invention are disclosed in the following detailed description and the accompanying drawings.

FIG. 2 is a block diagram illustrating an embodiment of a system to.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Composable application session parameters are disclosed. In various embodiments, an application developer is provided, via a software development tool, with an interface to compose one or more application session parameters. Application session parameters may, for example, be made available across application user interface pages and/or fragments thereof, application action flows, application user interface events, etc. In some embodiments, application session variables may be stored as attributes of an application session parameter object. In various embodiments, application session parameter values may be determined and/or modified as defined by the developer, e.g., via an expression evaluated at runtime, and/or may be used as arguments in expressions, functions, etc. evaluated at runtime.

Figure 1:
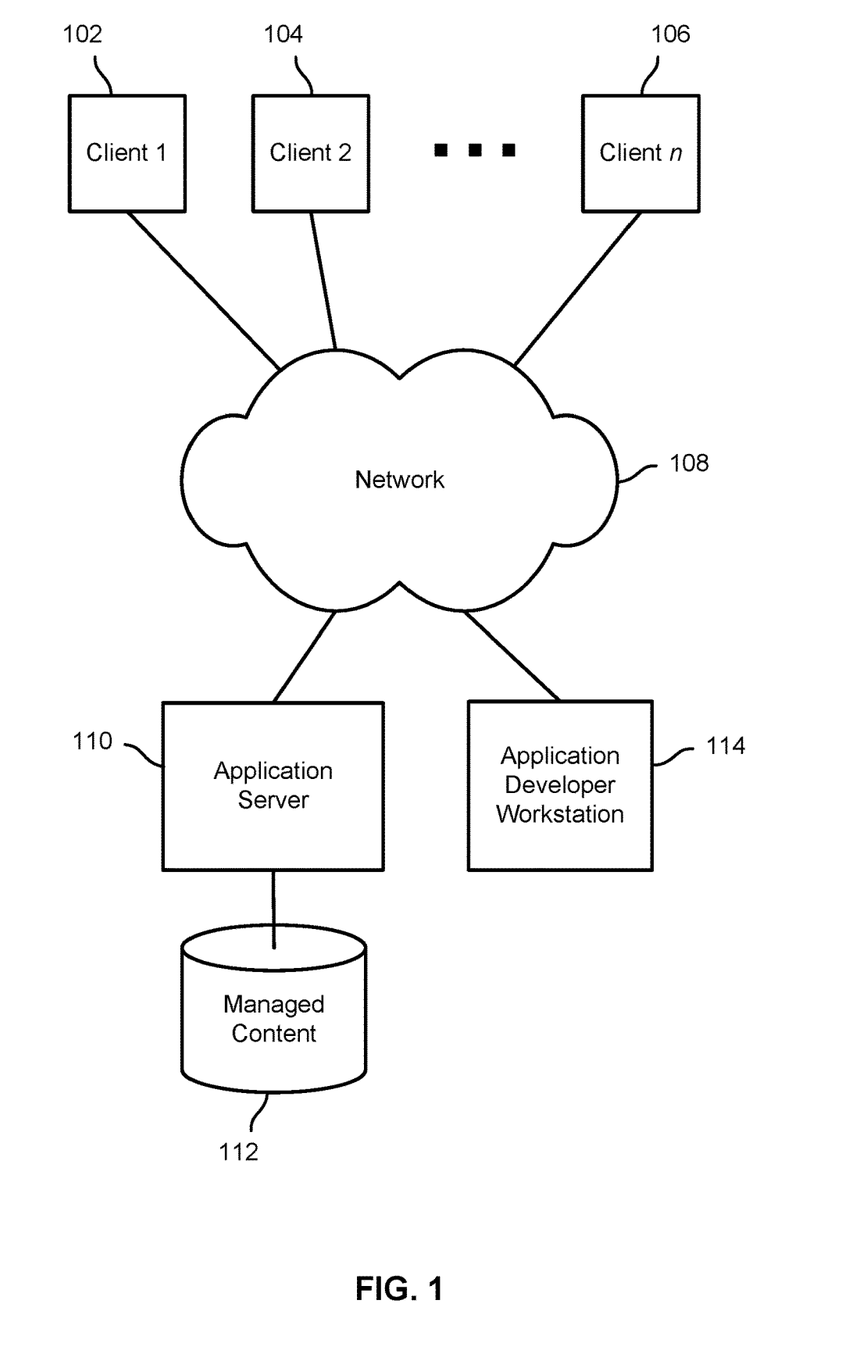
FIG. 1 is a block diagram illustrating an embodiment of an application development system and environment.

FIG. 1 is a block diagram illustrating an embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®.

In various embodiments, a visual or other development tool interface to enable developers to compose developer-composed custom application session parameters. Definitions are received via the interface and stored. The definitions are used to generate application code which at runtime initializes, stores, and manages application session parameters, as defined by the developer.

Figure 2:
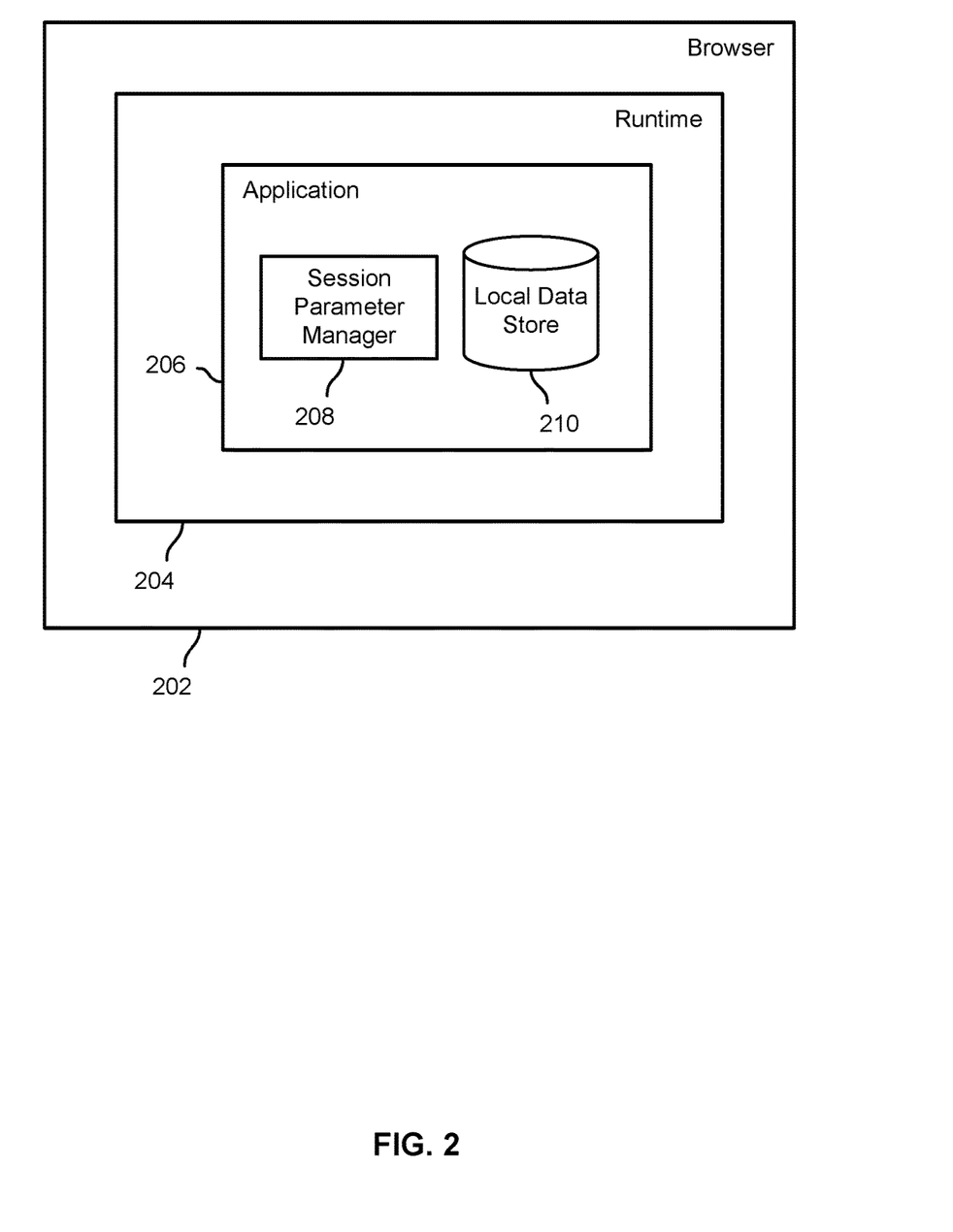

FIG. 2 is a block diagram illustrating an embodiment of a system to. In the example shown, browser software 202, running for example on a client system such as client systems 102, 104, and 106, provides a runtime environment 204 in which application code associated with an application 206 executes. In some embodiments, the application code associated with application 206 may be retrieved from an application server, such as application server 110 of FIG. 1. The application 206 includes an application session parameter manager 208 and a local data store 210. In some embodiments, the session parameter manager 208 includes one or more software objects configured to store and manage application session parameters as attributes. Examples of an application local data store 210 include a local data store provided to the application 206 by the browser 202, for a browser 202 having such a capability, and one or more cookies managed by browser 202 on behalf of application 206.

Figure 3:
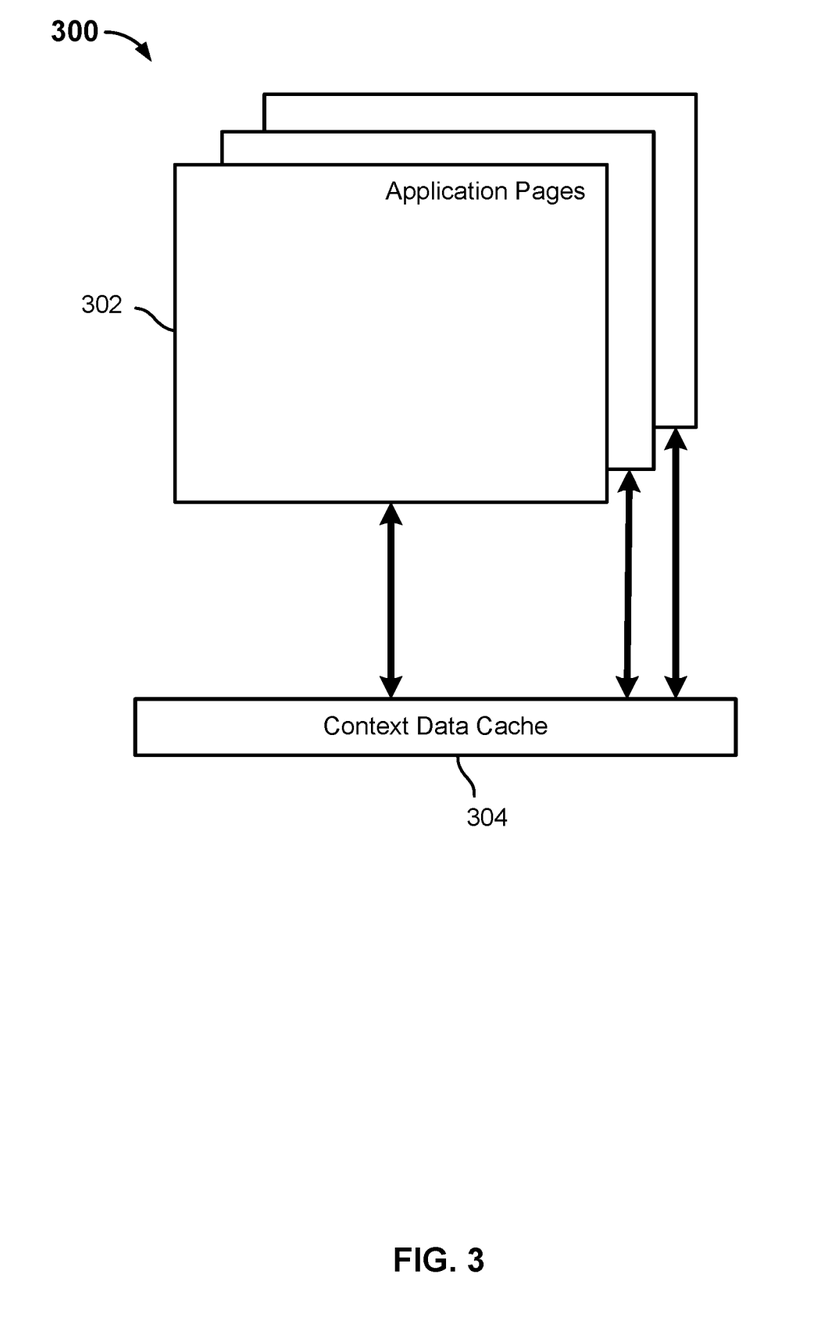
FIG. 3 is a block diagram illustrating an embodiment of an application configured to use developer-composed application session parameters.

FIG. 3 is a block diagram illustrating an embodiment of an application configured to use developer-composed application session parameters. In the example shown, the application 300 includes a plurality of application user interface pages 302, each of which includes one or more widgets, data services, and/or other page elements, and/or partial pages (e.g., fragments) comprising such elements, and each of which is configured to access application session parameters and/or other application context data from an application local data store, such as the context data cache 304 shown in FIG. 3. In various embodiments, elements comprising application pages 302 may publish events having as a payload one or more values used to store initially and/or modify the value of one or more application session parameters. For example, an expression may be evaluated using as input an application event payload and/or other values to determine a value of an application session parameter to be stored and made available to other application pages and/or elements, such as action flows, etc., for example via the context data cache 304 or some other local data store or other mechanism.

Figure 4:
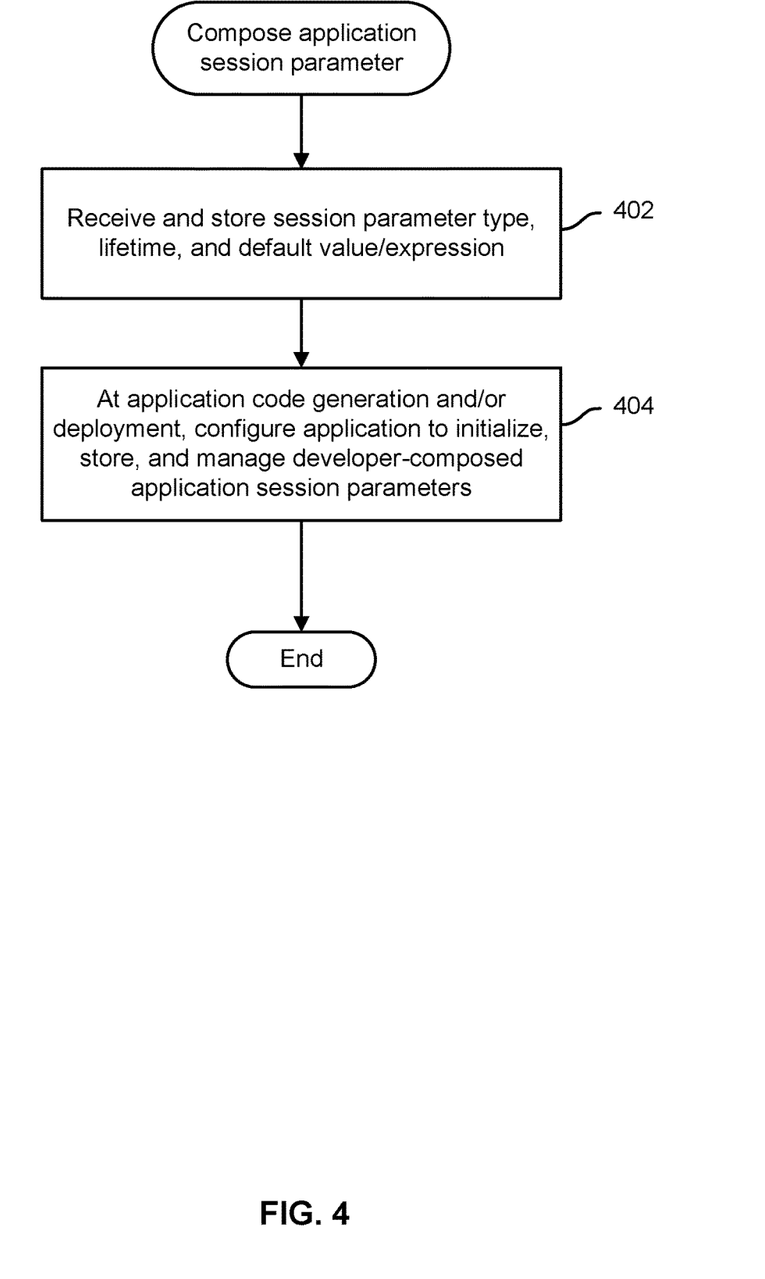
FIG. 4 is a flow chart illustrating an embodiment of a process to compose an application session parameter.

FIG. 4 is a flow chart illustrating an embodiment of a process to compose an application session parameter. In the example shown, an indication is received, e.g., via an application software development tool user interface, that a custom application session parameter is desired to be defined and used in an application being developed. Application session parameter definitional inputs, such as session parameter type (e.g., primitive, data model, etc.); lifetime (e.g., discarded at end of current user's current application session, etc.); and default value (e.g., specific value, expression to be evaluated at initialization to determine value, etc.) are received and stored (402). At application code generation and/or deployment time, the stored application session parameter definitional values are used to generate programmatically and include in the application code to initialize, store, and manage the developer-composed application session parameters (404). Examples include without limitation application code configured to provide and instantiate a JavaScript or other software object to store, manage, and provide access to application session parameters.

Figure 5:
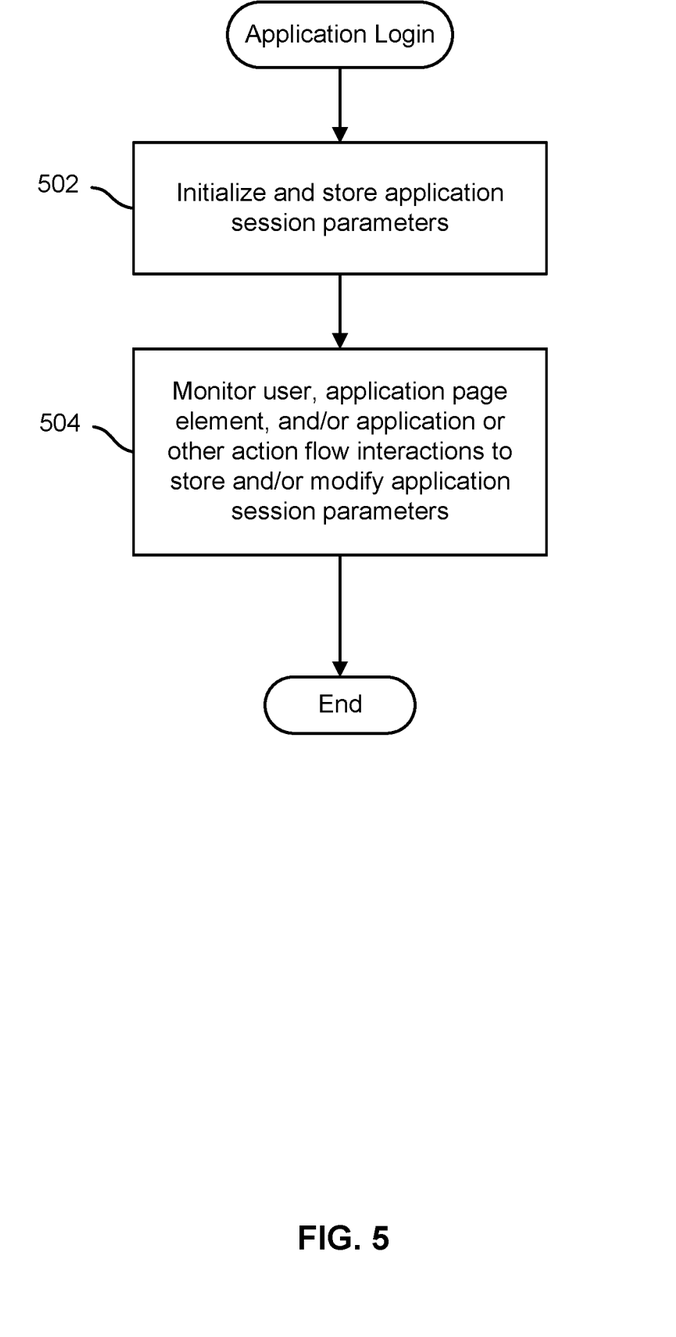
FIG. 5 is a flow chart illustrating an embodiment of a process to store and manage application session parameters.

FIG. 5 is a flow chart illustrating an embodiment of a process to store and manage application session parameters. Upon application login by a user, an application session associated with the user is established, and application session parameters may be initialized and stored (502). In various embodiments, one or more of session data and/or other context data, one or more expressions, etc. may be used to initialize and store application session parameters associated with the user's application session. In various embodiments, the application session parameters and their respective values are defined at development time using an application session parameter composition interface as disclosed herein. User, application page element, application or other action flow, and/or other interactions are monitored to store and/or modify the initial and/or other application session parameters (504). For example, user interface events and/or other actions originated by page elements, fragments, etc., may result in one or more application session parameters being stored and/or modified. In various embodiments, a session parameter manager, such as session parameter manager 208 of FIG. 2, stores and/or modifies application session parameters as required.

Figure 6:
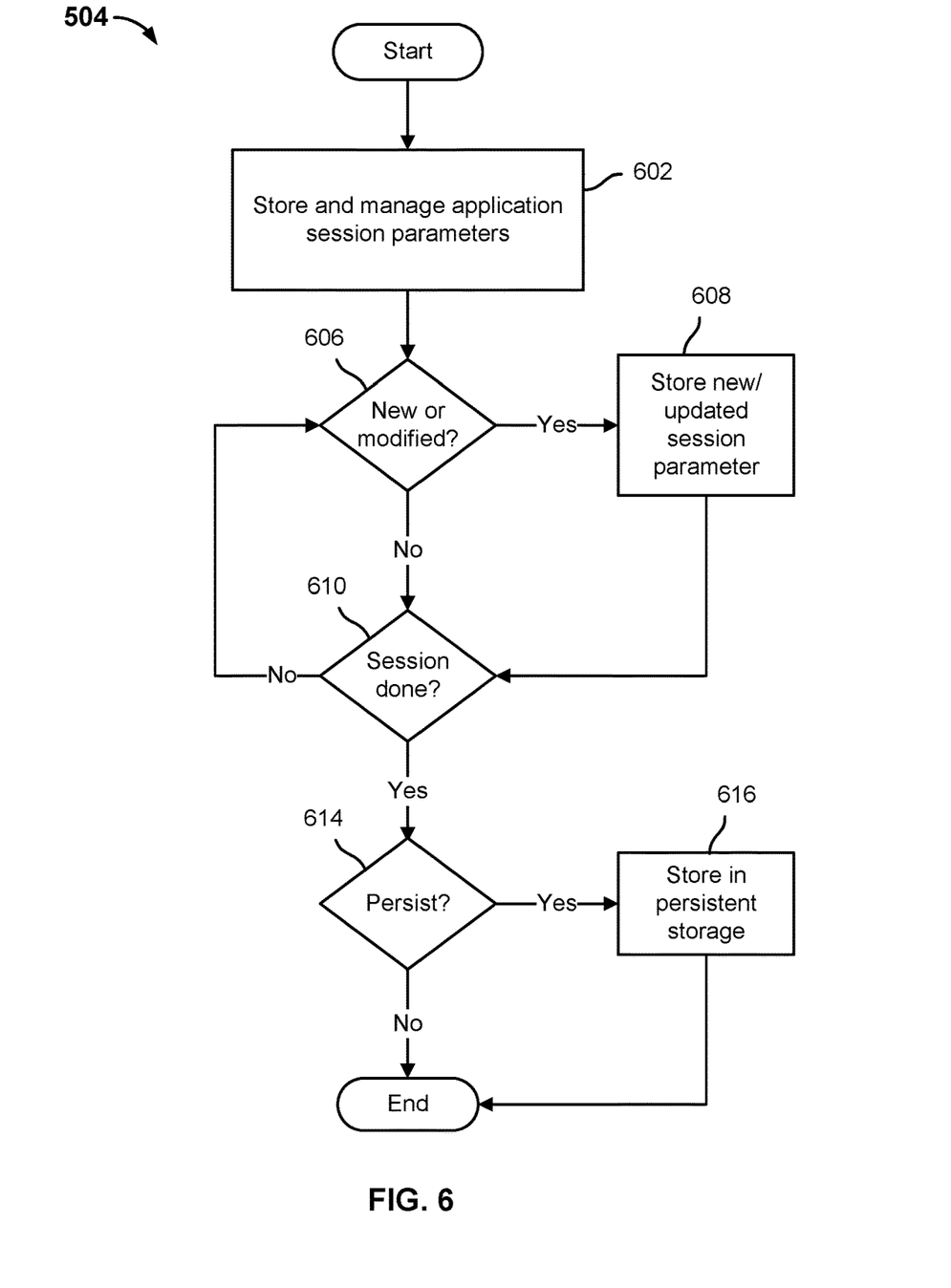
FIG. 6 is a flow chart illustrating an embodiment of a process to store and manage application session parameters.

FIG. 6 is a flow chart illustrating an embodiment of a process to store and manage application session parameters. In the example shown, a component configured to store and manage session parameters (602), e.g., session parameter manager 208 of FIG. 2, upon detecting that a new application session parameter is to be stored or that a value of an already-stored application session parameter is to be modified (606), the new/modified application session parameter is stored (608). Once the user's application session is done (610), it is determined whether one or more of the current application session parameter values is to be stored persistently, e.g., to be available beyond expiration of the current application session (614). For example, a user's last search, and/or user actions reflected in application session parameters that reflect user preference, e.g., with respect to how information is displayed in application pages, may be desired to remain available beyond the close of the current application session, e.g., to enable such values to be used in a future session of the same user, such as to allow the user to pick up work where the user left off, or to arrange information in a way the user prefers. If one or more application session parameters are to be stored persistently beyond the session end (614), the application session parameter values are stored (616) and the process ends. Otherwise, the process ends without the application session parameter values being stored persistently (614).

Using techniques disclosed herein, a highly dynamic and flexible application can be defined, enabling the developer to provide interactions and functionality that may not be possible without the ability to define and manage application session parameters as disclosed herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving, via a software development tool user interface, a definition of a custom application session parameter associated with a first user session of an application executing within a browser, wherein the browser is configured to provide a runtime environment in which application code associated with the application executes, wherein the application includes an application session parameter manager and an application local data store, wherein the first user session of the application is established upon a user logging into the application that is executing in the runtime environment provided by the browser, wherein the definition of the custom application session parameter includes at least a lifetime field indicating a lifetime associated with the custom application session parameter, wherein a value of the lifetime field indicates whether the custom application session parameter is to be discarded at the end of a user's application session, wherein the value of the lifetime field of the custom application session parameter included in the definition of the custom application session parameter indicates that the value of the custom application session parameter is to be stored beyond the end of the first user session of the application and to be available for a second user session of the application that is executing in the runtime environment provided by the browser, wherein the second user session of the application is established upon the user logging into the application after the first user session; and generating programmatically, using a processor, based at least in part on the definition, the application code configured to store and manage the custom application session parameter, including by making the custom application session parameter available across a plurality of application user interface pages, wherein the value of the custom application session parameter is stored in the application local data store, wherein the application code includes code configured to create an instance of the application session parameter manager, wherein the instance of the application session parameter manager is configured to store in the application local data store and manage the custom application session parameter based at least in part on the field indicating the lifetime associated with the custom application session parameter.

2. The method of claim 1, wherein the application session parameter manager comprises a JavaScript or other software object.

3. The method of claim 1, wherein the application code is configured to use the application local data store associated with the runtime environment.

4. The method of claim 1, wherein the custom application session parameter is stored in the application local data store associated with the browser used to execute the application code.

5. The method of claim 1, wherein the definition includes a default value for the custom application session parameter.

6. The method of claim 5, wherein the default value comprises an expression.

7. The method of claim 6, wherein the application code is configured to evaluate the expression at runtime to determine the value for the custom application session parameter.

8. The method of claim 6, wherein the expression includes as an argument an application context data.

9. The method of claim 8, wherein evaluating the expression includes determining at runtime a value of the application context data.

10. The method of claim 1, further comprising receiving an indication that an application session with which an instance of the custom application session parameter is associated is ending; determining that the value of the instance of the custom application session parameter is to be stored beyond the end of the application session; and storing the value of the instance of the custom application session parameter in the application local data store.

11. The method of claim 1, wherein the definition of the custom application session parameter includes fields respectively corresponding to an indication of a session parameter type and a session parameter default value.

12. The method of claim 1, wherein the field indicating the lifetime associated with the custom application session parameter indicates whether the custom application session parameter is stored persistently so as to be available beyond expiration of an application session.

13. The method of claim 1, wherein the application session parameter manager updates the value of the custom application session parameter based at least in part on a context of at least one of the one or more other application user interface pages.

14. The method of claim 1, wherein the application code is further configured to, in response to the remote user logging into the application, establish the first application session associated with the remote user, and initialize the custom application session parameter based at least in part on context data stored in a context data cache.

15. A system, comprising:
a data storage device; and
a processor coupled to the data storage device and configured to:
receive, via a software development tool user interface, a definition of a custom application session parameter associated with a first user session of an application executing within a browser, wherein the browser is configured to provide a runtime environment in which application code associated with the application executes, wherein the application includes an application session parameter manager and an application local data store, wherein the first user session of the application is established upon a user logging into the application that is executing in the runtime environment provided by the browser, wherein the definition of the custom application session parameter includes at least a lifetime field indicating a lifetime associated with the custom application session parameter, wherein a value of the lifetime filed indicates whether the custom application session parameter is to be discarded at the end of a user's application session, wherein the value of the lifetime field of the custom application session parameter included in the definition of the custom application session parameter indicates that the value of the custom application session parameter is to be stored beyond the end of the first user session of the application and to be available for a second user session of the application that is executing in the runtime environment provided by the browser, wherein the second user session of the application is established upon the user logging into the application after the first user session; and
generate programmatically, using a processor, based at least in part on the definition, the application code configured to store and manage the custom application session parameter, including by making the custom application session parameter available across a plurality of application user interface pages, wherein value of the custom application session parameter is stored in the application local data store, wherein the application code includes code configured to create an instance of the application session parameter manager, wherein the instance of the application session parameter manager is configured to store in the application local data store and manage the custom application session parameter based at least in part on the field indicating the lifetime associated with the custom application session parameter.

16. The system of claim 15, wherein the data storage device comprises a memory device.

17. The system of claim 15, wherein the application code is configured to use the application local data store.

18. The system of claim 15, wherein the custom application session parameter is stored in the application local data store associated with the browser used to execute the application code.

19. A computer program product embodied in a non-transitory computer readable storage medium and comprising computer instructions for:
receiving, via a software development tool user interface, a definition of a custom application session parameter associated with a first user session of an application executing within a browser, wherein the browser is configured to provide a runtime environment in which application code associated with the application executes, wherein the application includes an application session parameter manager and an application local data store, wherein the first user session of the application is established upon a user logging into the application that is executing in the runtime environment provided by the browser, wherein the definition of the custom application session parameter includes at least a lifetime field indicating a lifetime associated with the custom application session parameter, wherein a value of the lifetime field indicates whether the custom application session parameter is to be discarded at the end of a user's application session, wherein the value of the lifetime field of the custom application session parameter included in the definition of the custom application session parameter indicates that the value of the custom application session parameter is to be stored beyond the end of the first user session of the application and to be available for a second user session of the application that is executing in the runtime environment provided by the browser, wherein the second user session of the application is established upon the user logging into the application after the first user session; and generating programmatically, using a processor, based at least in part on the definition, the application code configured to store and manage the custom application session parameter, including by making the custom application session parameter available across a plurality of application user interface pages, wherein the value of the custom application session parameter is stored in the application local data store, wherein the application code includes code configured to create an instance of the application session parameter manager, wherein the instance of the application session parameter manager is configured to store in the application local data store and manage the custom application session parameter based at least in part on the field indicating the lifetime associated with the custom application session parameter.

* * * * *